Dec. 3, 1940.   E. WICKSTROM ET AL   2,223,709
VENTILATING MEANS FOR AUTOMOBILES
Filed May 24, 1939
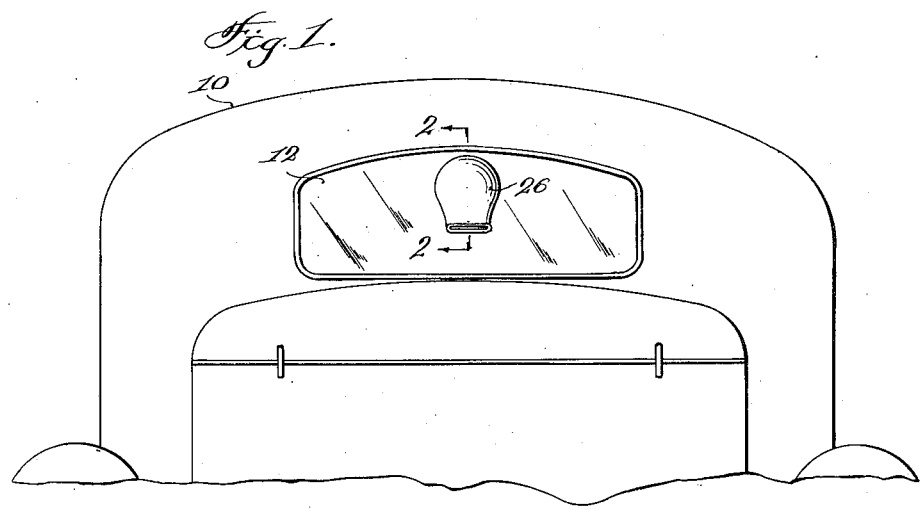
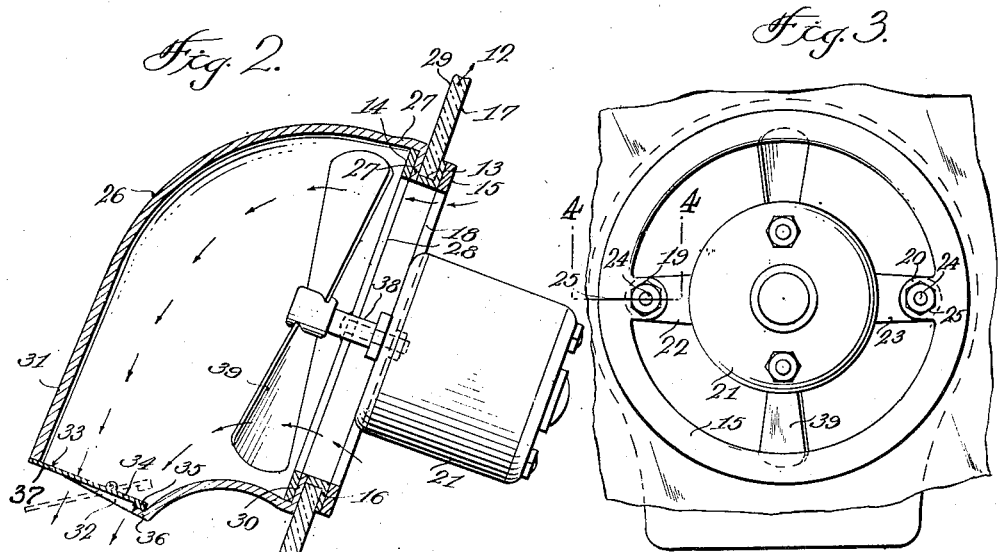
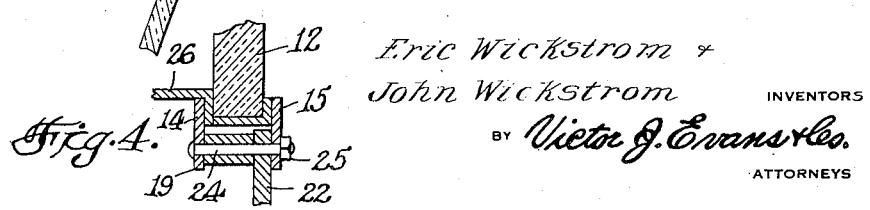
Eric Wickstrom &
John Wickstrom   INVENTORS
BY Victor J. Evans & Co.
ATTORNEYS Patented Dec. 3, 1940

2,223,709

UNITED STATES PATENT OFFICE 2,223,709

VENTILATING MEANS FOR AUTOMOBILES

Eric Wickstrom and John Wickstrom, Chicago, Ill.

Application May 24, 1939, Serial No. 275,522

4 Claims. (Cl. 98—2)

Our invention relates to new and useful improvements in ventilating means for automobiles.

An important object of our invention is the provision of a ventilating means for an automobile that will discharge the smoke and impure air therein into the atmosphere.

Another object of our invention is the provision of a ventilating means for an automobile that will prevent air or dust exteriorly of the vehicle from gaining access to the interior thereof.

Yet another object of our invention is the provision of a ventilating means for an automobile that may be easily installed for use.

Still another object of our invention is the provision of a ventilating means for an automobile that will substantially eliminate the formation of steam and frost on the windows of the vehicle during cold or rainy weather.

A further object of our invention is the provision of a ventilating means for an automobile that is simple in construction, efficient in operation and inexpensive to manufacture.

Other objects and advantages of our invention will be apparent during the course of the following description.

In the drawing, forming a part of this specification, and in which like numerals are employed to designate like parts throughout the same, Figure 1 is a fragmentary rear elevation of an automotive vehicle, and showing our device associated therewith, Figure 2 is an enlarged sectional view, taken on the line 2—2 of Figure 1, Figure 3 is a rear elevation of our device, and Figure 4 is a fragmentary sectional view taken on the line 4—4 of Figure 3.

In the accompanying drawing, wherein for the purpose of illustration, is shown a preferred embodiment of our invention, the numeral 10 designates an automotive vehicle of conventional shape and construction and having a rear vision window 12. Our device is adapted to be secured to the rear window 12 and to be received in a substantially circular opening 13 formed therein. The washer element 14 is positioned exteriorly of the window in circumventing relation to the opening 13 and a washer 15 circumvents the said opening interiorly of the window. A grommet 16 of rubber, or the like, is interposed between the face 17 of the window 12 and the face 18 of the washer 15 to prevent the said washer from chipping or breaking the same. The washers 14 and 15 are formed with diametrically opposed, horizontally aligned ears 19 and 20, and an electric motor 21 is formed with laterally extending arms 22 and 23, the extremities of which overlap the ears 19 and 20 of the washers 14 and 15 and are firmly secured within the window opening by means of the bolts and nuts 24 and 25, respectively which connect the ears 19 and 20 to hold the washers in appressed relation with the opposite sides of the window.

The substantially infundibular casing or nozzle 26 is preferably made of a flexible material such as rubber, or the like, and the periphery 30 of the large end 27 thereof is bent inwardly and interposed between the face 28 of the washer 14 and face 29 of the window, 12. The bolts and nuts 24 and 25 will hold the washers 14 and 15 tightly pressed against the outer and inner face of the window and the periphery 30 of the nozzle 26 securely positioned between the outer washer 14 and window 12. The outer end 31 of the casing is directed downwardly and is substantially smaller than the end 27 and a valve 33 is pivotally mounted therein. The side 34 of the valve is provided with a weighted portion 35 which is adapted to bear against the inwardly extending lip 36 of the casing, and the side 37 engages the bottom edge of the outer portion of the opening 32. The drive shaft 38 of the motor 21 has a fan 39 keyed, or otherwise secured, thereon and it may be electrically connected to the battery of the automobile or provided with a separate battery which will permit the same to operate independently of the mechanisms of the automobile.

It is a well known fact that if an automobile is operated in cold and rainy weather with the windows closed, steam and smoke will form on the windows thereby greatly impairing the vision of the occupants of the automobile. When the fan 39 of our device is in operation, the air within the vehicle will be circulated toward the rear thereof and discharged through the small opening 32 of the casing 26, and as the air circulates, the excess moisture and smoke in the air will be simultaneously discharged into the atmosphere. In cold weather when a heater is used to warm the interior of the car the fan 39 will cause a circulation of air toward the rear of the vehicle thereby greatly increasing the efficiency of the heater.

The form of our invention hereinbefore described and illustrated may be attached to any standard vehicle, but it is obvious that the device could be built into the body during the manufacturing stage if desired. If this were done the casing 26 could be made of metal or any desirable material and would not necessarily project beyond the plane of the outer surface of the body of the automobile. The discharge opening 32 could be made to open through the body and there would be no parts projecting exteriorly thereof. The only substantial difference in a built-in modification of the device, and the form here illustrated and described, would reside in the fact that there would be no parts projecting exteriorly of the vehicle and the device in its entirety could be attached to the top of the automobile thereby eliminating the necessity of making an opening in the rear vision window.

It is to be understood that the form of our invention, herewith shown and described, is to be taken as a preferred example of the same, and that various changes in the size, shape and arrangement of parts may be resorted to without departing from the spirit of our invention or the scope of the appended claims.

Having thus described our invention, we claim:

1. In an automobile having an opening in the rear window, the combination of washers circumventing the said opening on either side of the said window, a flexible casing having a discharge opening and an inwardly extending flange interposed between outer washer and the outer face of the window, means connecting the said washers to hold the same in appressed relation to the said window, and fan means positioned in the opening in the window and adapted to discharge air from within the vehicle through the discharge opening in the said casing.

2. In an automobile having an opening in the rear window thereof, the combination of washers circumventing the said opening on either side of the said window, a flexible substantially infundibular casing having the larger end thereof folded behind the outer washer and in appressed relation to the outer face of the window, means to hold the said washers in appressed relation with the opposite sides of the window, and fan means supported by the said washers and adapted to discharge air from within the said vehicle through the smaller end of the said casing.

3. In an automobile having an opening in the rear window thereof, the combination of washers circumventing the said opening on either side of the said window, a casing having a discharge opening and an inwardly extending flange interposed between outer washer and the outer face of the window, means connecting the said washers to hold the same in appressed relation to the said window, fan means positioned in the opening in the window and adapted to discharge air from within the vehicle through the discharge opening in the said casing, and valve means pivotally mounted in the discharge opening of the said casing, said valve means normally closing the said opening but adapted to open when the said fan is in operation.

4. In an automobile having an opening in the rear window thereof, the combination of washers circumventing the said opening on either side of the said window, a flexible substantially infundibular casing having the larger end thereof folded behind the outer washer and in appressed relation to the outer face of the window, means to hold the said washers in appressed relation with the opposite sides of the window, fan means supported by the said washers and adapted to discharge air from within the said vehicle through the smaller end of the said casing, and valve means pivotally mounted in the small end of the said casing, said valve means normally closing the said opening but adapted to open when the said fan is in operation.

ERIC WICKSTROM.
JOHN WICKSTROM.